United States Patent
Cavalli et al.

(10) Patent No.: US 11,577,477 B2
(45) Date of Patent: Feb. 14, 2023

(54) PRE-IMPREGNATED FIBRE-REINFORCED COMPOSITE MATERIAL AND MANUFACTURED ARTICLE OBTAINED BY FORMING AND COMPLETE CURING OF SAID PRE-IMPREGNATED FIBRE-REINFORCED COMPOSITE MATERIAL

(71) Applicants: PETROCERAMICS S.P.A., Bergamo (IT); NANO-TECH S.P.A., Ascoli Piceno (IT)

(72) Inventors: Lorenzo Cavalli, Bergamo (IT); Andrea Giovannelli, Ascoli Piceno (IT)

(73) Assignees: PETROCERAMICS S.P.A., Bergamo (IT); NANO-TECH S.P.A., Ascoli Peceno (IT)

( * ) Notice: Subject to any disclaimer, the term of this patent is extended or adjusted under 35 U.S.C. 154(b) by 0 days.

(21) Appl. No.: 16/636,076

(22) PCT Filed: Aug. 3, 2018

(86) PCT No.: PCT/IB2018/055844
§ 371 (c)(1),
(2) Date: Feb. 3, 2020

(87) PCT Pub. No.: WO2019/026036
PCT Pub. Date: Feb. 7, 2019

(65) Prior Publication Data
US 2020/0247971 A1    Aug. 6, 2020

(30) Foreign Application Priority Data
Aug. 3, 2017   (IT) ........................ 102017000089430

(51) Int. Cl.
B29C 70/44    (2006.01)
B32B 5/02     (2006.01)
(Continued)

(52) U.S. Cl.
CPC .............. *B29C 70/44* (2013.01); *B32B 5/022* (2013.01); *B32B 5/26* (2013.01); *C08J 5/042* (2013.01);
(Continued)

(58) Field of Classification Search
CPC .......... C08L 83/04; C08L 83/16; C08L 83/08; C08K 3/38; C08K 3/04; C08K 3/36;
(Continued)

(56) References Cited

U.S. PATENT DOCUMENTS

| | | |
|---|---|---|
| 5,552,466 A | 9/1996 | Beckley |
| 5,725,828 A | 3/1998 | Zank |

(Continued)

FOREIGN PATENT DOCUMENTS

| | | |
|---|---|---|
| CN | 1598280 A | 3/2005 |
| CN | 1793054 A | 6/2006 |

(Continued)

OTHER PUBLICATIONS

Anonymous:, "1166-BGF Industries, Inc" Jan. 1, 2018, hhttps://www.bgf.com/datasheet/1166, XP055460152.
(Continued)

*Primary Examiner* — Camie S Thompson
(74) *Attorney, Agent, or Firm* — Cantor Colburn LLP (57) ABSTRACT

The invention relates to a pre-impregnated fibre-reinforced composite material in laminar form, obtained impregnating a fibrous mass with a polymeric binder composition and intended to be subjected to successive forming and complete curing operations to produce a fibre-reinforced composite material. The polymeric binder composition comprises one or more resins chosen in the group consisting of siloxane resins and silsesquioxane resins, and can optionally comprise one or more organic resins. The polymeric binder composition appears as a liquid with viscosity between
(Continued)

55000 and 10000 mPas at temperatures between 50° C. and 70° C. The polymeric binder composition forms a polymeric binder matrix, not cross-linked or only partially cross-linked, that fills the interstices of the fibrous mass. The invention also relates to a method for making said pre-impregnated fibre-reinforced composite material in laminar form. The invention also relates to a manufactured article obtained by hot forming and complete curing of the aforesaid pre-impregnated fibre-reinforced composite material, as well as a method for making said manufactured article.

31 Claims, 3 Drawing Sheets

(51) Int. Cl.
    *B32B 5/26*     (2006.01)
    *C08J 5/04*     (2006.01)
    *C08J 5/24*     (2006.01)
    *B29K 83/00*     (2006.01)
    *B29K 105/08*     (2006.01)

(52) U.S. Cl.
    CPC .............. *C08J 5/243* (2021.05); *C08J 5/249* (2021.05); *B29K 2083/00* (2013.01); *B29K 2105/0854* (2013.01); *B32B 2260/021* (2013.01); *B32B 2260/046* (2013.01); *B32B 2262/023* (2013.01); *B32B 2262/106* (2013.01); *B32B 2307/304* (2013.01); *B32B 2307/3065* (2013.01); *B32B 2307/51* (2013.01); *B32B 2307/54* (2013.01); *B32B 2307/546* (2013.01); *C08J 2383/04* (2013.01)

(58) Field of Classification Search
    CPC .......... C08K 2003/2241; C09D 183/04; C09D 183/16; C09D 183/08; B29C 70/34; B29C 70/467; B29K 2083/00; B29K 2105/124; B32B 18/00; B32B 2260/023; B32B 2260/046; B32B 2262/0261; B32B 2262/101; B32B 2307/306; B32B 5/26; C08G 77/12; C08G 77/70; C08G 77/00; C04B 2235/3409; C04B 2235/3418; C04B 2235/3826; C04B 2235/5224; C04B 2235/5232; C04B 2235/5244; C04B 2235/5248; C04B 2237/38; C04B 35/571; C04B 35/6269; C04B 35/80; Y10T 156/1044; Y10T 428/249928; Y10T 428/25; Y10T 428/31663; Y10T 428/31612; Y10T 442/20; Y10T 442/2664; Y10T 442/2984; C08F 290/148; B05D 2518/10; Y10S 528/901

USPC .................. 156/222; 264/101; 427/294, 503; 428/193, 323, 447, 429, 96; 524/261, 524/265, 500, 701, 588, 858; 525/477; 528/34, 10, 30, 32, 33; 252/78.3; 28/169; 516/55; 522/99
See application file for complete search history.

(56) References Cited

U.S. PATENT DOCUMENTS

| | | | |
|---|---|---|---|
| 6,743,393 | B1 | 6/2004 | Petrak |
| 2010/0304152 | A1 | 12/2010 | Clarke |
| 2012/0034428 | A1 | 2/2012 | Clarke |
| 2015/0099078 | A1 | 4/2015 | Fish |
| 2020/0207668 | A1* | 7/2020 | Cavalli ............... C04B 35/6269 |

FOREIGN PATENT DOCUMENTS

| | | |
|---|---|---|
| CN | 101717255 A | 6/2010 |
| CN | 102584307 A | 7/2012 |
| CN | 103951455 A | 7/2014 |
| CN | 104926341 A | 9/2015 |
| DE | 4016052 A1 | 11/1991 |
| EP | 0423689 A2 | 4/1991 |
| EP | 0549224 A1 | 12/1992 |
| EP | 0549224 A1 | 6/1993 |
| EP | 0963250 A2 | 8/1999 |
| GB | 2150581 A | 7/1985 |

OTHER PUBLICATIONS

International Search Report for corresponding application PCT/IB2018/055842 filed Aug. 3, 2018; dated Oct. 30, 2018.
International Search Report for corresponding application PCT/IB2018/055844 filed Aug. 3, 2018; dated Nov. 2, 2018.
Jens Schroter, "Handbuch Medienwissenschaft", Apr. 11, 2014, URL: www.dcproductucts.com.au, XP055460111.
Sr 355s: "Technical Data Sheet SR 55S", Jul. 30, 2011, URL: https://www.momentive.com, XP055460099.
Written Opinion for corresponding application PCT/IB2018/055842 filed Aug. 3, 2018; dated Oct. 30, 2018.
Written Opinion for corresponding application PCT/IB2018/055844 filed Aug. 3, 2018; dated Nov. 2, 2018.
Bongio et al.:"Polymer derived ceramic matrix composites for friction application": Advances in Applied Ceramics: vol. 108, No. 8, 2009, pp. 483-487.
Office Action (Letter Restarting Period for Response) for U.S. Appl. No. 16/636,068 dated Feb. 28, 2022.
Final Office Action dated Sep. 27, 2022; U.S. Appl. No. 16/636,068; filed Feb. 3, 2020 (16 pages).
Non-Final Office Action dated Oct. 28, 2021; U.S. Appl. No. 16/636,068; filed Feb. 3, 2020 (21 pages).

* cited by examiner

PRE-IMPREGNATED FIBRE-REINFORCED COMPOSITE MATERIAL AND MANUFACTURED ARTICLE OBTAINED BY FORMING AND COMPLETE CURING OF SAID PRE-IMPREGNATED FIBRE-REINFORCED COMPOSITE MATERIAL

FIELD OF THE INVENTION

The present invention relates to a pre-impregnated fibre-reinforced composite material and a manufactured article obtained by forming and complete curing of said pre-impregnated (pre-preg) material.

The pre-impregnated fibre-reinforced composite material according to the present invention (hereafter also, more briefly, called "pre-preg") is intended to be subjected to successive forming operations (in particular hot forming) and complete curing to obtain a fibre-reinforced composite material, finding application as a basic material for the production—through successive treatments and work processes—of components intended to operate at medium temperatures (up to 400° C.), for example thermal or flameproof barriers or structural parts intended to operate at temperatures up to 400° C.

STATE OF THE ART

As is known, fibres or reinforcing fabrics that have been impregnated with a polymeric composition using machines are called "pre-preg" or pre-impregnated. The fibres or fabrics form the reinforcement of the pre-preg, while the polymeric composition forms the matrix thereof. Since the polymeric composition (which forms the matrix of the pre-impregnated material) was applied to the fibres by means of specific calibrated machinery, the ratio by weight (or by volume) between matrix and reinforcement is precisely determined and constant on the entire surface of the reinforcement.

A pre-preg therefore is a pre-impregnated fibre-reinforced composite material with a polymeric binder composition.

The manual impregnation technique, even if assisted by appropriate instruments, has the name of "wet layup". This technique comprising mixing a thermosetting composition (matrix) with a curing agent and subsequently the impregnating step. Reinforcing fabrics impregnated with this technique necessarily have fluctuations in the ratio between reinforcement and matrix. Manually impregnated fabrics can be used immediately or stored for short time intervals before being used.

A pre-preg consists of fibres, generally carbon fibres and/or glass fibres and/or ceramic fibres, arranged to form a fabric or a nonwoven fabric, and impregnated with a thermosetting or thermoplastic polymeric composition.

Thermoplastic matrices are processed by heating to higher temperatures than the typical glass transition temperature of the material. This allows polymeric chains to move and slide on each other, until the temperature is again brought below the glass transition temperature (Tg), in a reversible process.

In the case of thermosetting matrices, the work processes are carried out before an amount of chemical bonds is created between adjacent chains (cross-linking or curing) such as to prevent their relative motion, bringing the polymer to be cured in a non-reversible process. Following curing, the polymeric composition, impregnating the fibres, forms a binding matrix that fixes the fibres to each other.

In the production of pre-preg, the thermoplastic polymeric binder compositions used are, for example, polyether ether ketone (PEEK), polyetherimide (PEI) and poly paraphenylene sulfide (PPS).

In pre-preg production, the thermosetting polymeric compositions used are based on organic resins, generally epoxydic or phenolic, or resins based on vinyl ester or cyanate ester. For these purposes, within these families of resins, resins are used with such rheological characteristics (in particular viscosity and pseudoplasticity) as to make it possible to obtain:

the desired degree of integration/impregnation between fibres and resin during the impregnation step;

adequate flexibility of the pre-preg during the handling and forming steps, while preventing the resin from dripping;

adequate fluidity of the resin at temperatures near the curing temperature, enabling the fibre layers to slide advantageously on each other in order to best copy the geometry of the mold.

The thermosetting matrices used for the production of pre-preg already contain all the components necessary to allow its cross-linking and are known, in the technical jargon, as "mono-component resins".

During the production of the pre-preg the thermosetting polymeric matrix is not crosslinked or is only partially crosslinked, so as to make the pre-preg manipulable, but still workable. For this purpose, the pre-preg is preserved at low temperature to prevent crosslinking from being completed.

Operatively, the process for producing a pre-preg comprises an impregnating step in which the fibres are placed on flat surfaces and in this configuration they are impregnated with the polymeric composition. During this step, the partial cross-linking of the thermosetting polymeric composition can take place at variable temperatures in the prior art according to the polymeric composition used. The material is then cooled to ambient temperature. The pre-preg is then available in the form of flat workable foils, which may then be worked to obtain components with far more complex shapes, for example by layering or rolling and subsequent shaping operations.

The organic resins provide the pre-preg with good mechanical resistance characteristics already after partial cross-linking.

Pre-pregs acquire superior mechanical characteristics after the complete cross-linking of the organic resins with which they are impregnated. This operation takes place during a step of forming the pre-preg (preferably hot forming), and it may be completed in a subsequent heat treatment step (post-curing). The cross-linking of the resins can be fully obtained during the forming step, or it can be completed in a subsequent post-curing step, if the forming step is carried out at lower temperatures or for insufficiently long times.

Components obtained from pre-preg after hot forming, and possible post-curing, can already be used as they are, i.e. without additional treatment, i.e. "as cured".

In traditional "as cured" pre-pregs, the cross-linked organic resins provide the composite material obtained with good mechanical resistance characteristics.

Because of the organic matrix defined by organic resins, traditional "as cured" pre-pregs, however, cannot operate at temperatures above 250° C. in oxidizing atmosphere because of the softening (the glass transition temperature, better known as Tg, is exceeded) and of the thermal degradation of the polymeric matrix. This limits their use as thermal or flameproof barriers or structural components operating at high temperatures.

A traditional pre-preg based on organic resins can present, for example, the following limits:

low operating temperature of the composites obtained after complete cross-linking of the resins; while these composites have excellent mechanical resistance characteristics, it is difficult for them to work above 250° C. in oxidizing atmosphere;

low resistance to wear from mechanical abrasion, due to the very nature of the organic matrices present in the composites obtained.

Hence, there is a need to produce pre-pregs that can lead, following complete cross-linking of the polymeric binder composition, to composite materials having much higher thermal stability both in oxidizing atmosphere, and in inert atmosphere, being able to operate at higher temperatures than those possible with organic resins.

To date, this need has not been met because alternative resins potentially able to satisfy the aforesaid technical requirements, for example silicone-organic preceramic resins (siloxane resins, silazanic resins, etc.) have such characteristics as to make them unsuitable for the production of pre-preg which can be stored for weeks at ambient temperature, or for months at low temperatures, while having similar workability characteristics to pre-pregs impregnated with the most common thermosetting matrices.

The main problems observable today in the use of silicone-organic resins in the fabrication of composite materials, and more specifically of pre-pregs, are summarized below.

Silazanes and polysalazanes appears as liquids at low viscosity formed by mixtures of oligomers or polymers with low molecular weight. They have the ability to cure in relatively short times (from hours to a few days) at ambient temperature and they are highly susceptible to hydrolysis reactions facilitated by the presence of water, radiation or protic solvents as alcohols or acids: these reactions are thermodynamically facilitated and they lead to the formation of silica ($SiO_2$) and of ammonia or amines. The Si—N bond is energetically unfavored with respect to the Si—O bond and, in the presence of humidity, the hydrolysis reaction that leads to the formation of silicon oxides takes place spontaneously. These instability problems make polysazanes difficult both to synthesize and to use, since the presence of an inert atmosphere (nitrogen or argon) is always necessary to prevent its degradation. Their sensitivity to atmospheric humidity and to light radiation therefore tends strongly to accelerate the different chemical reactions. Cross-linking, also by heat, determines a severe weight loss (which may even exceed 50%) because of the release of ammonia, water and amines, in addition to the evaporation of the solvents that are often present in solution. These characteristics make silazanes (also including polysilazanes) unsuitable for obtaining pre-pregs with commercial value, because they are not preservable for sufficiently long time intervals. Moreover, silazanes and polysalazanes generally have much higher cost both than the organic resins commonly used for the manufacture of pre-pregs, and than siloxane resins. This aspect makes silazanes and polysilazanes particularly disadvantageous for productions of components that can be proposed on the market. Moreover, composite materials with silazanic matrix do not allow to obtain, following curing, mechanical properties of relevance for structural applications. Lastly, because of the release of non-negligible quantities of ammonia, water and amines in gaseous form by these compounds, the resin matrix of the resulting pre-preg is generally porous, which is an undesired characteristic of the final product especially for the purposes of mechanical resistance and rigidity; aesthetics is negatively affected as well. It should also be observed that every pore—once certain dimensions are exceeded—can become a point from which cracks can develop.

Siloxanes and polysiloxanes can instead appear as low-viscosity liquids or as solids at ambient temperatures. These composites are mainly used in the formulation of coatings able to withstand high temperatures, but over time they have also raised interest in the field of composite materials and of ceramifiable composite materials because of their high thermal stability. Their structure is determined by the presence of Si—O bonds in the main chain and therefore they are more stable than the Si—N bonds present in the silazanes. Different radicals such as vinyl, methyl, methoxylic groups, etc can bond to the main chain. Although the stability of uncured polysiloxanes is higher than that of silazanes, these compounds too are sensitive to the humidity present in the air, which is able to trigger hydrolysis and condensation reactions, leading to a degradation of their properties in a few hours or a few days. Use of solvents to improve their workability and to prolong the utilization time requires solvents used in significant quantities compared to the weight of the polymer. Lastly, causing the solvent to evaporate before use determines an immediate aggression of the polymeric matrix by the humidity present in the air and, depending on the composition, also a partial curing thereof, which tends to make the matrix extremely fragile and prone to breaking up. On the other hand, eliminating the solvent during curing determines a rather significant weight loss of the resin, in addition to the weight loss that siloxanes naturally exhibit after curing, increasing its porosity and concurrently diminishing the mechanical characteristics the composite material should have.

Compositions based on polymeric composites containing silicon have been described in the prior art.

The patent application US 2015/099078 A1 describes a composition comprising a polysazane, a polysiloxane, and a solid boron compound in the form of powder having a value d50 of less than 1 µm. The compositions of this document have the disadvantages of silazane, pointed out above, and in addition they require the use of powders of boron composites with controlled grain size, a condition that adds a productive complication with the associated costs.

The U.S. Pat. No. 5,552,466 describes a composition comprising a polysilsesquioxane and at least a polydiorganosiloxane, wherein the two components at ambient temperature have viscosity above 500,000 mPas the former, and between 10 and 1000 mPas the latter. The composition of this patent, too, has the disadvantages pointed out above, inasmuch as there is no chemical component adapted to inhibit the reactions of hydrolysis and condensation and more in general of curing and to make it possible to obtain pre-preg that maintains unaltered for long time intervals its chemical-physical and workability characteristics. Moreover, the mechanical characteristics of the cured polymers can in no way be compared with the most common polymers on the market.

Lastly, the patent application EP 0936250 A2 describes a fibre-reinforced material prepared impregnating fibres (for example, glass or ceramic) with a single solid or liquid methylsilsesquioxane. Use of a single silicone resin entails difficulties in the impregnation of fibres in pre-preg manufacturing processes because it is not possible to control its rheological characteristics: impregnation can be achieved without solvent with complex methodologies, as described in paragraph [0030] of the document; or, alternatively, employing a solvent for the resin, forming a solution that contains from 40% to 70% by weight thereof (paragraph [0031] of the application), but in this case there are problems of imperfect dimensional control of the manufactured part (because of the non-negligible volume of solvent that evaporates), the risk of obtaining a highly porous polymeric matrix because of the evaporation of a high volume of solvent, and poor mechanical strength of the final resin.

Presentation of the Invention

Therefore, an object of the present invention is to eliminate, or at least to reduce, the aforementioned problems, relating to the prior art, making available a pre-impregnated fibre-reinforced composite material (pre-preg) with a polymeric binder composition that does not contain, or at least does not exclusively contain organic resins, such as epoxydic or phenolic resins or resins based on vinyl ester or cyanate ester.

In particular, a purpose of the present invention is to make available a pre-impregnated fibre-reinforced composite material (pre-preg) with a polymeric binder composition that does not contain, or at least does not exclusively contain organic resins such as epoxydic or phenolic resins or resins based on vinyl ester or cyanate ester, and that can lead following complete cross-linking of the polymeric binder composition, to composite materials that have much higher thermal stability both in oxidizing atmosphere, and in inert atmosphere compared with traditional pre-pregs, being able to operate up to temperatures of 400° C.

Another purpose of the present invention is to make available a pre-impregnated fibre-reinforced composite material (pre-preg) with a polymeric binder composition based on silicone polymers such as siloxanes and silsesquioxanes that remains flexible and workable for long time intervals, assuring a shelf life of several days at ambient temperature and of over 12 months if preserved at low temperatures.

Another purpose of the present invention is to provide a pre-impregnated fibre-reinforced composite material (pre-preg) that, once cured, has far higher mechanical properties than composites obtained with silicone resins and mixes thereof according to the state of the art.

An additional purpose of the present invention is to provide a pre-impregnated fibre-reinforced composite material (pre-preg) which, once cured, has mechanical properties comparable with those of composite materials with epoxydic matrix, vinyl ester or cyanate ester, but which unlike them does not have mechanical characteristics that decay markedly during exposure to high temperature.

A further purpose of the present invention is to obtain a pre-impregnated fibre-reinforced composite material (pre-preg) that is more easily workable than pre-pregs based on BMI (bismaleimide) or polyimide resins, making the forming operations altogether similar to those that take place with the more common pre-pregs with epoxydic matrix.

DESCRIPTION OF THE DRAWINGS

The technical features of the invention can be clearly understood from the content of the claims that follow and its advantages shall be more readily apparent in the detailed description that follows, made with reference to the accompanying drawings, which represent one or more purely exemplifying and non-limiting embodiments, in which:

DETAILED DESCRIPTION

The object of the present invention is a pre-impregnated fibre-reinforced composite material, obtained impregnating a fibrous mass with a polymeric binder composition, hereafter also briefly referred to as "pre-preg".

Said pre-impregnated fibre-reinforced composite material is intended to be subjected to successive subsequent forming and complete curing operations to obtain a fibre-reinforced composite material.

According to the invention, unlike traditional pre-pregs impregnated exclusively with organic resins (phenolic or epoxydic resins or resins based on vinyl ester or cyanate ester), the polymeric binder composition is based on one or more resins selected in the group consisting of siloxane resins and silsesquioxane resins.

The expression "based on . . . " means that the resins selected in the group consisting of siloxane resins and silsesquioxane resins constitute at least 70% by weight of the polymeric binder composition.

Optionally, the aforesaid polymeric binder composition can comprise organic resins, preferably epoxydic resins, phenolic resins and/or resins based on vinyl ester or cyanate ester. However, organic resins, if present, do not constitute more than 30% by weight of the polymeric binder composition.

Preferably, the aforesaid polymeric binder composition comprises only resins chosen in the group consisting of siloxane resins and silsesquioxane resins, and does not comprise organic resins.

Silsesquioxane resins are polymeric resins comprising polysiloxanes or are polysiloxane-based, while silsesquioxane resins are polymeric resins comprising polysilsesquioxanes or are polysilsesquioxane-based.

Polysiloxanes and polysilsesquioxanes are compounds characterized by the presence of silicon—oxygen bonds in the main chain.

polysiloxanes have the following basic structure while polysilsesquioxanes have the following basic structure According to another aspect of the present invention, the aforesaid polymeric binder composition is semi-solid at ambient temperature and it appears as a liquid with viscosity between 55000 and 10000 mPas at temperatures between 50° C. and 70° C.

In particular, viscosity is understood to be measured with a Brookfield viscometer, with a shear rate of 1 s−1, unless otherwise indicated in the text.

In particular, the aforesaid polymeric binder composition appears as a liquid with viscosity ranging between approximately 55000 mPas at 50° C. applying a shear rate of 1 s−1 and approximately 10000 mPas at 70° C. regardless of the shear rate.

In particular, the polymeric composition also has a pseudoplastic behavior (with viscosity decreasing as the shear rate increases) that increases as temperature decreases. In more detail, the polymeric composition appears as a pseudoplastic liquid up to temperature of approximately 60° C. tending to a Newtonian behavior beyond this temperature.

This feature allows the polymeric composition to behave like an elastic, flexible solid at ambient temperature, thus preventing it from dripping and being separated from the fibres. At growing temperatures, on the contrary, the polymeric composition tends to behave progressively more like a fluid, until becoming nearly Newtonian. Viscosity at 50° C. is equal to approximately 55000 mPas applying a shear rate of 1 s−1 and 25000 mPas applying a shear rate of 3 s−1. At 60° C., viscosity is approximately 18000 mPas at 3 s−1 and measures 16000 mPas at 8.5 s−1, hence tending to the typical behavior of a Newtonian fluid.

These rheological characteristics make the polymeric binder composition particularly suited for impregnating fibrous masses in the pre-preg manufacturing process.

Preferably, the composition further comprises at least one solvent, selected among the compounds capable of solubilizing polysiloxanes and polysilsesquioxanes.

The function of the solvent is to maintain over time the rheological characteristics of the resin, thus making the pre-preg manipulable for a longer time, so that the pre-preg can be processed more easily and preserved for longer times.

Preferably, the aforesaid solvent is divinylbenzene, which has the advantage of having low vapor pressure and of not being flammable.

This solvent then has a function as a stabilizing agent (or reaction inhibitor).

Advantageously, the solvent can be selected in the class of vinyl compounds.

Preferably, the solvent constitutes less than 1% by weight of the pre-impregnated fibre-reinforced composite material (pre-preg). Still more preferably, the solvent constitutes at least 0.2% by weight of the pre-impregnated fibre-reinforced composite material (pre-preg).

Preferably, the solvent consists of divinylbenzene, present in the pre-impregnated fibre-reinforced composite material (pre-preg) with a percentage of less than 1% by weight, and in particular no lower than 0.2% by weight.

Advantageously, alternatively or in combination with the aforesaid solvent (preferably consisting of divinylbenzene), it is possible to use other compounds having the function of stabilizing agents, selected in particular in the group consisting of: acetophenone, ethylbenzene, diethylbenzene, ethylstyrene, 2-tert-Butylphenol, 2-6-Di-tert-butylphenol, butylated hydroxytoluene, 2,4-Dymethyl-6-tert-butylphenol.

Preferably, the compounds listed above are used mixed with the solvent (in particular with the divinylbenzene) to facilitate its dissolution in the polymeric composition even at ambient temperature.

Advantageously, the stabilizing function can be carried out by a mixture of two or more of the compounds listed above.

Preferably, the solvent and/or the stabilizing agent (alternative or additional to the solvent) are present—alone or mixed—in the pre-impregnated fibre-reinforced composite material (pre-preg) with a percentage of less than 1% by weight, and in particular of no less than 0.2% by weight.

Advantageously, the presence of solvent (serving as a stabilizing agent) and/or of a stabilizing agent (alternative or additional to the solvent) selected in the class of the compounds listed above, in the percentages by weight indicated above, solves the known problems of degradation of siloxanes and silsequioxanes.

More in detail, the solvent (and/or any alternative or additional stabilizing agent) has the function of slowing as much as possible even the partial reactions of curing, hydrolysis and condensation, thus maintaining over time the chemical and rheological characteristics of the resin, making the pre-preg manipulable for a longer time and providing the resin itself with the adhesive characteristics necessary for manipulating the material during the impregnating steps and during the steps of utilizing the pre-preg for forming manufactured articles.

The curing of the polymeric composition of the invention then takes place at suitable speeds only above a given threshold temperature, depending on the boiling point of the solvent and/or of the stabilizing agent used and on the quantities indicated above.

By way of example, said threshold temperature is between 125 and 150° C. if ethylstyrene or diethylbenzene are used, which have a boiling point of respectively 192° C. and 184° C. or, if divinylbenzene is used, which has a boiling point of 195° C.

In the pre-impregnated fibre-reinforced composite material in laminar form according to the invention, the polymeric binder composition forms a binding matrix, not cross-linked or only partially cross-linked, which fills the interstices of the fibrous mass. In this way, the fibre-reinforced composite material in laminar form is on one hand manipulable, and on the other hand still flexible.

Advantageously, the pre-impregnated fibre-reinforced composite material in laminar form according to the invention can be obtained according to a traditional production process for the manufacture of a pre-preg:
    arranging the fibrous mass in laminar form;
    impregnating step at temperatures between 60 and 100° C., during which the fibrous mass is impregnated with the polymeric binder composition; and
    cooling to ambient temperature the composite material thus obtained.

Preferably, the production process for manufacturing a pre-preg is based on hot-melt technology.

In particular, application of the polymeric binder composition on the fibrous mass can be obtained depositing the polymeric composition beforehand on a transfer support (for example, made of paper). The presence of the transfer support facilitates the deposition of the polymeric binder composition on the fibrous mass. The deposition of the polymeric composition on the transfer support is achieved in a so-called step of filming the polymeric binder composition.

Alternatively, the polymeric binder composition can be applied directly on the fibrous mass.

In particular, the pre-impregnated fibre-reinforced composite material according to the invention can be obtained in the form of ribbons supported by polymeric or silicone release paper films that are commonly wound to form rolls ready to be used or to be stored awaiting utilization.

In particular, said ribbons may then be subsequently processed to obtain components with far more complex shapes, for example by stratification or rolling and subsequent shaping operations. These components may then be subjected to complete cross-linking to obtain final products with specific characteristics.

Siloxane and silsesquioxane resins have different characteristics from the organic (mainly epoxydic) resins normally used for manufacturing pre-pregs based on carbon fibres or glass fibres or ceramic fibres.

Siloxane and silsesquioxane resins exhibit, following curing, a far greater temperature stability, thanks to their lower weight loss, both in oxidizing atmosphere and in inert atmosphere.

Organic resins are theoretically more suited for manufacturing pre-pregs to be used "as cured" and at low temperatures, because they provide the composite with superior mechanical characteristics. As has already been pointed out, however, these traditional "as cured" pre-pregs do not assure operating temperatures above approximately 250° C.

The pre-impregnated fibre-reinforced composite material with siloxane or silsesquioxane resins according to the invention is particularly indicated for applications at high temperatures, in conditions at which the compounds with organic base could not operate.

The materials obtained starting from a pre-impregnated fibre-reinforced composite material (pre-preg) according to the invention can be used for obtaining composites to be applied "as cured".

The term "as cured" means that the pre-impregnated fibre-reinforced composite material (pre-preg) according to the invention is used immediately after the complete cross-linking of the polymeric binder matrix. In this way siloxane or silsequioxane resins retain their polymeric structure and have more similar characteristics to those of an organic polymer.

As will be described below, the characteristics of a manufactured article obtained from forming and complete curing of the pre-preg according to the invention are:
  high mechanical characteristics (ultimate tensile stress above 550 MPa and in particular elastic modulus close to 110 GPa, however such values are closely tied to the fibres and fabrics used)
  Low thermal conductivity (<2 W/(m·K));
  Operating temperature up to 400° C.

Application for which composites obtained in this way can be of interest are, for example, thermal or flameproof barriers or components with structural function that have to operate at high temperatures.

According to a preferred embodiment of the invention, the aforesaid polymeric binder composition constitutes from 25% to 60% by weight of said pre-impregnated fibre-reinforced composite material, while the fibrous mass constitutes from 40% to 75% by weight of said pre-impregnated fibre-reinforced composite material.

The content of fibres and of polymeric binder composition can be varied according to the characteristics to be obtained in the final materials to be produced starting from the pre-preg according to the invention.

A pre-preg with high fibre content is more indicated for applications for which high mechanical characteristics are required. A higher percentage of polymeric binder composition can instead be more indicated for applications requiring higher operating temperatures, flameproof protection or resistance to mechanical wear.

According to a preferred embodiment of the invention, the aforesaid polymeric binder composition consists of a mixture of:
  at least one resin selected from the group consisting of polysiloxanes and polysilsesquioxanes, solid at room temperature, with melting point range of between 40° C. and 90° C.; and
  at least one resin selected from the group consisting of siloxane resins and silsesquioxane resins, liquid at room temperature, with viscosity at ambient temperature of between 1 mPas and 5000 mPas.

In general, the weight ratio between solid resin at ambient temperature and liquid resin at ambient temperature is selected so that the polymeric binder composition obtained from the mixture of the two resins appears as a liquid with viscosity between 55000 and 10000 mPas at temperatures between 50° C. and 70° C.

Preferably, the weight ratio between solid resin at ambient temperature and liquid resin at ambient temperature is selected so that the polymeric binder composition obtained from the mixture of the two resins appears as a liquid with viscosity between 55000 mPAs at 50° C. and approximately 10000 mPas at 70° C., with a markedly pseudoplastic behavior from ambient temperature to approximately 50° C.

Preferably, the weight ratio between solid resin at room temperature and liquid resin at room temperature is between 100/30 and 100/50.

Preferably, the solid resin at ambient temperature is selected from the group consisting of: a phenyl siloxane resin (for example, commercial products Silres® 601 manufactured and sold by Wacker Chemie AG or RSN-0217 manufactured and sold by Dow Corning Corp.), methyl siloxane resin, methyl phenyl silsequioxane resin (for example, the commercial product Silres® H44, Wacker Chemie AG), or methyl silsesquioxane resin (for example, commercial products Silres® MK, Wacker Chemie AG).

Preferably, the liquid resin at ambient temperature is selected from the group consisting of: a methyl methoxy siloxane resin (for example, commercial product Silres® MSE 100, Wacker Chemie AG) and methyl phenyl vinyl siloxane resin (for example, commercial product Silres® H62 C, Wacker Chemie AG).

Advantageously, the liquid resin can be selected among the liquid siloxane resins with no solvent or with solvent content below 2%.

According to a preferred embodiment of the invention, the solid resin is a phenyl siloxane resin, while the liquid resin is a methyl methoxy siloxane resin.

Advantageously, as stated previously, the aforesaid polymeric binder composition can further comprise at least one solvent, selected among the compounds able to solubilize polysiloxanes and polysilsesquioxanes.

As specified previously, the function of the solvent is to maintain over time the rheological characteristics of the resin, thus making the pre-preg manipulable for a longer time, so that the pre-preg can be processed more easily and preserved for longer times.

Preferably, the aforesaid solvent is divinylbenzene, which has the advantage of having low vapor pressure and of not being flammable.

Advantageously, the solvent can be selected in the class of vinyl compounds.

Preferably, the solvent (if present) constitutes less than 1% by weight of the pre-impregnated fibre-reinforced composite material, and in particular no less than 0.2% by weight. Preferably, the solvent (if present) constitutes between 0.2% and 1% by weight of the pre-impregnated fibre-reinforced composite material.

Advantageously, alternatively or in combination with the aforesaid solvent (preferably consisting of divinylbenzene), it is possible to use other compounds having the function of stabilizing agents, selected in particular in the group consisting of: acetophenone, ethylbenzene, diethylbenzene, ethylstyrene, 2-tert-Butylphenol, 2-6-Di-tert-butylphenol, butylated hydroxytoluene, 2,4-Dymethyl-6-tert-butylphenol.

Preferably, the compounds listed above are used mixed with the solvent (in particular with the divinylbenzene) to facilitate its dissolution in the polymeric composition even at ambient temperature.

Advantageously, the stabilizing function can be carried out by a mixture of two or more of the compounds listed above.

Preferably, the solvent and/or the stabilizing agent (alternative or additional to the solvent) are present—alone or mixed—in the pre-impregnated fibre-reinforced composite material (pre-preg) with a percentage of less than 1% by weight, and in particular of no less than 0.2% by weight.

Advantageously, the presence of solvent (serving as a stabilizing agent) and/or of a stabilizing agent (alternative or additional to the solvent) selected in the class of the compounds listed above, in the percentages by weight indicated above, solves the known problems of degradation of siloxanes and silsequioxanes.

More in detail, as specified above, the function of the solvent (and/or any alternative or additional stabilizing agent) is to slow done as much as possible even the partial reactions of curing, hydrolysis and condensation, thus maintaining over time the chemical and rheological characteristics of the resin, making the pre-preg manipulable for a longer time and provide the resin itself with the adhesive characteristics necessary for manipulation of the material during the impregnating steps and during the steps of utilizing the pre-preg for forming manufactured articles.

The curing of the polymeric composition of the invention then takes place at suitable speeds only above a given threshold temperature, depending on the boiling point of the solvent and/or of the stabilizing agent used and on the quantities indicated above.

By way of example, said threshold temperature is between 125 and 150° C. if ethylstyrene or diethylbenzene are used, which have a boiling point of respectively 192° C. and 184° C. or, if divinylbenzene is used, which has a boiling point of 195° C.

Advantageously, the aforesaid polymeric binder composition can comprise at least one catalyst adapted to promote the cross-linking of the polymers (polysiloxanes and/or polysilsesquioxanes) of the polymeric binder composition at temperatures above 100° C.

The presence of the catalyst makes the processes more suitable for industrial production because it reduces the times and temperatures necessary to form the pieces.

In particular, the catalyst can be inserted directly in the polymeric composition or it can be added to the polymeric binder composition during the preparation of the pre-preg, at a temperature preferably lower than 100° C., so that, during these steps, it remains latent and does not initiate the cross-linking reaction of the polymeric binder composition. The catalyst then has to perform its function at the temperature at which the composite would subsequently be formed (for example 150-180° C.)

Preferably, the catalyst is selected from the group consisting of titanates, metal octoates and amines or a combination thereof.

Still more preferably, the catalyst is selected in the group consisting of: titanium tetrabutanolate (for example supplied by Wacker Chemie AG with the commercial name "Catalyst TC 44"); zinc octoate; and N-[3-(Trimethoxysilyl)propyl] ethylenediamine (for example, supplied by Wacker Chemie AG with the commercial name "Geniosil® GF 91").

The catalyst (if present) constitutes less than 1% by weight of the polymeric matrix of the pre-impregnated fibre-reinforced composite material.

According to a preferred embodiment of the present invention, the aforesaid polymeric binder composition can consist of a mixture of:
  a single resin selected from the group consisting of siloxane resins and silsesquioxane resins, liquid at ambient temperature, with viscosity at ambient temperatures of between 1 mPas and 5000 mPas; and
  an inert filler in powder form, able to provide the polymeric binder composition with the rheological characteristics necessary to allow the impregnation of the fibrous mass.

In particular, the inert filler in powder form is introduced to increase the viscosity of the liquid resin at ambient temperature.

In general, the weight ratio between liquid resin at ambient temperature and inert filler in powder form is selected so that the polymeric binder composition obtained from their mixture appears as a liquid with viscosity between 55000 and 10000 mPas at temperatures between 50° C. and 70° C.

Preferably, the ratio by volume between liquid resin at ambient temperature and inert filler in powder form is between 10/100 and 40/100.

Advantageously, the aforesaid polymeric binder composition (even if it is defined by a mixture of multiple resins) can comprise a thermal insulating inert filler, preferably selected from the group consisting of oxides, silicates, phosphates or a combination thereof.

The term "inert" means a substance that does not participate in the curing reactions.

Preferably, the thermal insulating inert filler consists from 1% to 30% by volume of the pre-impregnated fibre-reinforced composite material.

The introduction of a thermal insulating inert filler in the polymeric binder composition is preferable if the pre-impregnated fibre-reinforced composite material is used to make materials to be used as thermal barriers.

Advantageously, the aforesaid fibrous mass can consist of fibres selected in the group consisting of: carbon fibres; glass fibres; ceramic fibres; or mixtures thereof.

In particular, carbon fibres are carbon fibres from polyacrylonitrile (PAN) and/or carbon fibres from pitch.

In particular, glass or ceramic fibres consist of silica, alumina, zirconia or silicon Carbide.

According to a preferred embodiment, the aforesaid fibrous mass consists only of carbon fibres (PAN or pitch).

Preferably, the fibrous mass consists of continuous fibres that form one or more layers of fabric or of nonwoven fabric.

Alternatively, the fibrous mass can consist of chop fibres dispersed in the matrix formed by the aforesaid polymeric binder composition.

As stated, the content of fibres and of polymeric binder composition can be varied according to the characteristics to be obtained in the final materials to be produced starting from the pre-preg according to the invention. A pre-preg with high fibre content is more indicated for applications for which high mechanical characteristics are required. A higher percentage of resin can instead be more indicated for applications requiring higher operating temperatures, flameproof protection or resistance to mechanical wear.

Some general formulations of the pre-impregnated fibre-reinforced composite material according to the invention are provided in the two following tables.

TABLE 1

| Formulation 1 | Pre-preg based on Pitch fibres [wt %] | Pre-preg based on PAN fibres [wt %] |
|---|---|---|
| Solid resin RSN-0217 (Dow Corning) | 20-40 | 20-40 |
| Liquid resin Silres MSE100 (Wacker) | <20 | <20 |
| Divinylbenzene (DVB) | <1 | <1 |
| Fiber content | 40-70 | 40-70 |

TABLE 2

| Formulation 2 | Pre-preg based on Pitch fibres [% by weight] | Pre-preg based on PAN fibres [% by weight] |
|---|---|---|
| Solid resin RSN-0217 (Dow Corning) | 20-30 | 25-35 |
| Liquid resin Silres MSE100 (Wacker) | 5-15 | 5-15 |
| Divinylbenzene (DVB) | <1 | <1 |
| Fiber content | 55-65 | 50-60 |

Some general formulations of the pre-impregnated fibre-reinforced composite material according to the invention, also comprising at least one organic resin, are provided in Table 3 below.

TABLE 3

| Formulation 3 | Pre-preg based on Pitch fibres [% by weight] | Pre-preg based on PAN fibres [% by weight] |
|---|---|---|
| Solid resin RSN-0217 (Dow Corning) | 20-30 | 25-35 |
| Liquid resin Silres MSE100 (Wacker) | 0-5 | 0-5 |
| Phenolic resin Norsophen 1203 | 5-10 | 5-10 |
| Divinylbenzene (DVB) | <1 | <1 |
| Fiber content | 55-65 | 50-60 |

It has been possible to verify experimentally that a pre-impregnated fibre-reinforced composite material (pre-preg) with a polymeric binder composition based on silicone polymers such as siloxanes and silsequioxanes, comprising in mixture less than 1% by weight of a solvent (with stabilizing function) selected among the composites listed above, and preferably divinylbenzene, remains flexible and workable for long time intervals, assuring a shelf life of several days (from 20 to 30 days) at ambient temperature and of 12 months if preserved at low temperatures.

Differently, the same pre-impregnated fibre-reinforced composite material (pre-preg) with a polymeric binder composition not comprising the aforesaid solvent (with stabilizing function) does not remain flexible and workable for long time interval, presenting a shelf life of between 24 and 36 hours at ambient temperature. Moreover, the step of filming and impregnating the fibres with the pre-impregnated fibre-reinforced composite material (pre-preg) with a polymeric binder composition not comprising the aforesaid solvent was found to be more difficult.

Comparative Example of Assessment of Shelf-Life and Tack

To assess the effect of the preferred solvent (stabilizing agent), some tests were carried out to assess whether the initial characteristics of the polymeric composition are maintained over time. In particular, the adhesiveness (tack) of the uncured polymeric composition over time, and the workability characteristics of the pre-preg were assessed.

It has been observed that the polymeric composition lacking stabilizer (solvent), if left in air, tends to change from transparent to white as time goes by, to rapidly lose adhesiveness and ultimately to completely lose elasticity, becoming a white, solid and extremely fragile compound, tending to break up under even the weakest stress.

For this purpose, two samples were prepared with the composition of the invention. The sample 1 does not have DBV in the composition, the sample 2 has a part of DVB by weight of the solid resin. In the same way, two pre-pregs were prepared, one not containing DVB (pre-preg 1) and the other one containing 1 part by weight of DVB like the sample 2.

The same quantity of resin for each sample was cast in an open silicone mold reaching a thickness of approximately 0.5 mm and spread on two metallic plates with surface area of 50×150 mm. The samples were exposed to air and to atmospheric humidity with an average temperature of 26° C. and a relative humidity of between 47% and 60%. At predetermined intervals, the color and the consistency of the samples cast in the silicone molds were observed and the adhesiveness of samples of resin spread on the metallic supports was measured. The devised measurement method comprises making a polymeric film adhere on the face in contact with air using a known weight (3 kg aluminum plate). To measure the minimum force necessary to detach the film, the plate is positioned with the film towards the ground, a minimum part is detached therefrom and a gripper to which known weights are then secured is engaged thereto for the entire width of 50 mm.

The pre-pregs were preserved at ambient temperature and protected by two polymeric films. The tables 3a and 3b below show the results of the tests.

TABLE 3a

| | Sample 1 | | Sample 2 | |
|---|---|---|---|---|
| hours | Appearance | Tack [kg] | Appearance | Tack [kg] |
| 1 | transparent, flexible | 0.6 | transparent, flexible | 0.9 |
| 3 | partly white, flexible | 0.3 | transparent, flexible | 0.49 |
| 20 | white, solid fragile | 0 | white, flexible | 0.2 |

TABLE 3b

| | Pre-preg 1 | | Pre-preg 2 | |
|---|---|---|---|---|
| days | Workability | Tack | Workability | Tack |
| 0 | flexible | low | flexible | high |
| 1 | flexible | nil | flexible | high |
| 3 | rigid, not workable | nil | flexible | low |
| 20 | rigid, not workable | nil | flexible | nil |

An object of the present invention is also a method for making a pre-impregnated fibre-reinforced composite material (intended to be subjected to subsequent hot forming and complete curing operations to make a fibre-reinforced composite material), in particular according to the present invention and in yet more detail as described above.

According to a general embodiment, said method comprises the following operating steps:
- arranging a fibrous mass in laminar form;
- arranging a polymeric binder composition;
- impregnating said fibrous mass with said polymeric binder composition obtaining a pre-impregnated fibre-reinforced composite material.

Preferably, the impregnating step is carried out using traditional machines using in the pre-preg industry.

According to the invention, the aforesaid polymeric binder composition consists of one or more resins selected from the group consisting of siloxane resins and silsesquioxane resins.

As stated above, the expression "based on . . . " means that the resins selected in the group consisting of siloxane resins and silsesquioxane resins constitute at least 70% by weight of the polymeric binder composition.

Optionally, the aforesaid polymeric binder composition can comprise organic resins, preferably epoxydic resins, phenolic resins and/or resins based on vinyl ester or cyanate ester. However, organic resins, if present, do not constitute more than 30% by weight of the polymeric binder composition.

Preferably, the aforesaid polymeric binder composition comprises only resins chosen in the group consisting of siloxane resins and silsesquioxane resins, and does not comprise organic resins.

As stated above, silsesquioxane resins comprise polysiloxanes, while silsesquioxane resins comprise polysilsesquioxanes.

According to the invention, the aforesaid polymeric binder composition appears as a liquid with viscosity between 55000 and 10000 mPas at temperatures between 50° C. and 70° C.

In particular, viscosity is understood to be measured with a Brookfield viscometer, with a shear rate of 1 s−1, unless otherwise indicated in the text.

In particular, the aforesaid polymeric binder composition appears as a liquid with viscosity ranging between approximately 55000 mPas at 50° C. applying a shear rate of 1 s−1 and approximately 10000 mPas at 70° C. regardless of the shear rate.

In particular, the polymeric composition also has a pseudoplastic behavior (with viscosity decreasing as the shear rate increases) that increases as temperature decreases. In more detail, the polymeric composition appears as a pseudoplastic liquid up to temperature of approximately 60° C. tending to a Newtonian behavior beyond this temperature.

This feature allows the polymeric composition to behave like an elastic, flexible solid at ambient temperature, thus preventing it from dripping and being separated from the fibres. At growing temperatures, on the contrary, the polymeric composition tends to behave progressively more like a fluid, until becoming nearly Newtonian. Viscosity at 50° C. is equal to approximately 55000 mPas applying a shear rate of 1 s−1 and 25000 mPas applying a shear rate of 3 s−1. At 60° C., viscosity is approximately 18000 mPas at 3 s−1 and measures 16000 mPas at 8.5 s−1, hence tending to the typical behavior of a Newtonian fluid.

These rheological characteristics make the polymeric binder composition particularly suited for impregnating fibrous masses in the pre-preg manufacturing process.

Following the impregnating step, the polymeric binder composition forms a binder polymeric matrix, not cross-linked or only partially cross-linked, which fills the interstices of the fibrous mass.

What is described above in relation to the pre-impregnated fibre-reinforced composite material according to the invention also applies to the method for making said pre-impregnated material according to the invention. For the sake of brevity, this description is not repeated, however it is understood to be extended to the manufacturing method as well.

An object of the present invention is a manufactured article obtained by hot forming and complete curing of the pre-impregnated fibre-reinforced composite material (pre-preg) according to the invention, and in particular as described above.

In the remainder of the description, the state assumed by a pre-preg after forming and complete curing of the polymeric binder composition will also be defined as "as cured".

According to the invention, the pre-preg from which the aforesaid manufactured article is obtained by hot forming and complete curing comprises a fibrous mass impregnated with a polymeric binder composition consisting of one or more resins selected from the group consisting of siloxane resins and silsesquioxane resins, with characteristics already described above and which, for brevity, will not be set forth again.

The manufactured article obtained by hot forming and complete curing of the aforesaid pre-preg consists of a fibre-reinforced composite material that comprises a solid binding polymeric matrix that fills the interstices of the fibrous mass of the pre-impregnated fibre-reinforced composite material and it consists of polysiloxanes and/or polysilsesquioxanes, cross-linked with each other following the cross-linking induced by the complete curing of the aforesaid one or more resins of the polymeric binder composition of the pre-impregnated fibre-reinforced composite material.

Preferably, said manufactured article can be a thermal or flameproof barrier or a component with structural function that has to operate at high temperatures, up to 400° C.

In accordance with a preferred embodiment, the solid binding polymeric matrix constitutes from 25% to 60% by weight of the fibre-reinforced composite material of which the manufactured article is made, while the fibrous mass constitutes from 40% to 75% by weight of the fibre-reinforced composite material of which the manufactured article is made.

The content of fibres and of binding polymeric matrix can be varied according to the characteristics to be obtained in the manufactured article according to the invention.

A material with high fibre content is more indicated for applications for which high mechanical characteristics are required. A higher percentage of resin can instead be more indicated for applications requiring higher operating temperatures, flameproof protection or resistance to mechanical wear.

In particular, the fibrous mass can consist of fibres selected in the group consisting of carbon fibres, glass fibres, ceramic fibres or mixtures thereof. In particular, carbon fibres are carbon fibres from polyacrylonitrile (PAN) and/or carbon fibres from pitch, while glass or ceramic fibres consist of alumina, zirconia or silicon Carbide.

According to a preferred embodiment, the fibrous mass consists only of carbon fibres, PAN or pitch.

Preferably, the fibrous mass consists of continuous fibres that form one or more layers of fabric or of nonwoven fabric.

Alternatively, the fibrous mass can consist of chop fibres dispersed in the matrix formed by the aforesaid polymeric binder composition.

Advantageously, the solid binding polymeric matrix of the fibre-reinforced composite material of which the manufactured article is made can comprise a thermal insulating inert filler in the form of powder. The presence of this filler is functional to reduce the thermal conductivity of the material, increasing its thermal insulating properties.

The presence of a thermal insulating filler in the fibre-reinforced composite material of which the manufactured article is made is to be preferred if the manufactured article is a thermal or flameproof barrier or a component with structural function that has to operate at high temperatures.

Preferably, the inert thermal insulating filler in the form of powder is selected from the group consisting of oxides, silicates and phosphates or a combination thereof.

Advantageously, hot forming is achieved by compression molding, preferably carried out with a pressure of no less than 40 bar and at a temperature of no less than 300° C. for a time no shorter than 150 minutes.

Another object of the present invention is a method for making the aforesaid manufactured article.

According to a general embodiment, said method comprises the following operating steps:

arranging an impregnated fibre-reinforced composite material (pre-preg) with a polymeric binder composition according to the invention, and in particular as described above; and forming said pre-impregnated fibre-reinforced composite material (pre-preg) bringing the polymeric binder composition to curing so as to obtain said article.

Forming leads to the curing of said one or more resins of the polymeric binder composition and hence to forming a solid binding polymeric matrix that fills the interstices of the fibrous mass of the impregnated fibre-reinforced composite material (pre-preg) and that is based on polysiloxanes and/or polysilsesquioxanes, cross-linked with each other following the cross-linking induced by the complete curing of the aforesaid one or more resins of the polymeric binder composition of the impregnated fibre-reinforced composite material (pre-preg).

Preferably, the polymeric binder composition constitutes from 25% to 60% by weight of the impregnated fibre-reinforced composite material (pre-preg), while the fibrous mass constitutes from 40% to 75% by weight of the impregnated fibre-reinforced composite material (pre-preg).

Advantageously, forming is achieved hot by compression molding, preferably carried out with a pressure of no less than 40 bar and at a temperature of no less than 200° C. for a time between 60 and 150 minutes.

Alternatively, forming is achieved by vacuum bagging and subsequent curing thermal treatment.

Preferably, the aforesaid vacuum bagging is carried out at a pressure of between 2 and 14 bar and at a temperature between 150° C. and 300° C. for a time of 1 to 6 hours, which may be followed by a post-curing cycle at a temperature between 250° C. and 300° C. for a time of 1 to 3 hours. Still more preferably, forming by vacuum bagging is carried out a temperature between 250° C. and 300° C. for a time of 1 to 10 hours.

The polymeric binder composition to be used in the present invention has already been described above in relation to the pre-impregnated fibre-reinforced composite material according to the invention. For simplicity of description, these characteristics are not repeated again, but they are understood also to be referred to the method for making the manufactured article.

Application Examples

As stated above, the pre-impregnated fibre-reinforced composite material according to the present invention finds particular application as a basic material for the production by forming and complete curing of the polymeric binder composition intended to operate at medium temperature (up to 400° C.), for example thermal barriers or flameproof barriers or structural parts intended to operate at temperature up to 400° C.

It has been possible to verify experimentally that the pre-impregnated fibre-reinforced composite material according to the invention that does not contain or, at least, does not exclusively contain organic resins (such as epoxydic resins, phenolic resins or resins based on vinyl ester or cyanate ester) can lead, following complete cross-linking of the polymeric binder composition, to composite materials that have—compared with materials obtained from traditional pre-pregs impregnated with organic resins—a much higher thermal stability both in oxidizing atmosphere, and in inert atmosphere and that can operate up to temperatures of 400° C. for a time no shorter than 4 hours. It has been possible to verify that the composite materials obtained with the pre-preg according to the invention can operate up to temperatures of 400° C. for a time no shorter than 24 hours.

Fiber-reinforced composite materials according to the present invention were tested, starting from pre-pregs (according to the invention) impregnated with two different formulations of the polymeric binder composition, lacking organic resins. The two formulations differ essentially in that a formulation is made with carbon fibres from pitch and the other formulation is made with carbon fibres from polyacrylonitrile (PAN).

In both formulations, the same resins were used, changing the weight ratios to maintain constant the ratios by volume between resins and fibres. This became necessary because the different types of fibres have different densities.

The two formulations correspond to the two formulations indicated in table 2 above.

As polymeric binder composition, a mixture of two siloxane resins was used, of which one that is solid at ambient temperature and one that is liquid at ambient temperature. The weight ratio between solid resin and liquid resin is between 100/30 and 100/50.

The solid resin used was the resin RSN-0217 (marketed by Dow Corning); it is a phenyl siloxane resin, solid at ambient temperature, with melting point of approximately 80° C.

The liquid resin used was the resin Silres® MSE100 (marketed by Wacker Chemie); it is a methyl methoxy siloxane resin, liquid at ambient temperature, characterized by low viscosity, approximately 25-40 mPas at ambient temperature.

The solid resin is soluble in the liquid resin and a solution with weight ratios between 100/30 and 100/50 respectively between solid and liquid has optimal properties for the production of a pre-preg. In particular, the mixture has a semi-solid and sticky appearance at ambient temperature, whereas in the range from 50 to 70° C. appears as a highly viscous liquid (between 55000 and 10000 mPas measured with Brookfield viscometer), ideal characteristic to impregnate a fabric.

Carbon fibres were used in the form of a unidirectional laminate, i.e. consisting of fibres oriented along only one direction.

The laminate of fibres (Pitch or PAN fibres) was impregnated with the polymeric binder composition at a temperature between 70 and 75° C.

The impregnated laminate (pre-preg) thus obtained was then subjected to forming, inducing the curing (cross-linking) of the resins, without any subsequent treatment ("as cured" composite) obtaining a fibre-reinforced composite material according to the invention.

In particular, hot forming was carried out by compression molding. Tests were conducted at two different pressures: 51 bar and 26 bar. Forming was carried out at 300° C. for a minimum time of 150 minutes, to obtain the complete cross-linking of the polymeric binder composition, obtaining a completely cross-linked fibre-reinforced composite material with polymeric matrix, identified below as "as cured" composite. No post-curing step was carried out.

Some samples of fibre-reinforced composite material obtained after forming and complete cross-linking of the resins, without any subsequent treatment ("as cured" composite), were characterized conducting 3-point flexural tests in accordance with the ASTM C-1341 standard.

Table 4 shows the values of some mechanical properties of a sample of fibre-reinforced composite material, obtained with unidirectional laminate of PAN fibres, completely cross-linked, obtained by compression molding at a pressure of 51 bar. The characterization was conducted with 3-point flexural test in accordance with the ASTM C-1341 standard, testing the sample with fibre orientation at 0°, i.e. parallel to the greater dimension of the specimen.

TABLE 4

| Sample | Ultimate tensile stress [MPa] | | MOE [GPa] | | Deformation at break [%] | |
|---|---|---|---|---|---|---|
| Composite "as cured" | Mean | St. Dev. | Mean | St. Dev. | Mean | St. Dev. |
| UD Laminate PAN Fibers Orient. 0° | 537 | 44 | 76.0 | 1.7 | 0.74 | 0.10 |

Table 5 shows the values of some mechanical properties of a sample of fibre-reinforced composite material, obtained with unidirectional laminate of pitch fibres, completely cross-linked, obtained by compression molding at a pressure of 26 bar. The characterization was conducted with 3-point flexural test in accordance with the ASTM C-1341 standard, testing the sample with fibre orientation at 0°. The tests were also conducted on the composite after exposure at 400° C. in oxidizing atmosphere for 1 hour.

TABLE 5

| Composite Sample UD Laminate with Pitch fibres orientation 0° | MOR [MPa] | | MOE [GPa] | | Deformation at break [%] | |
|---|---|---|---|---|---|---|
| | Mean | St. Dev. | Mean | St. Dev. | Mean | St. Dev. |
| as cured | 389 | 53 | 134 | 29 | 0.46 | 0.01 |
| after exposure at 400° C. in air | 371 | 2 | 125 | 40 | 0.51 | 0.03 |

The data indicate that the exposure at 400° C. entails only a slight decline in the mechanical characteristics, which can be deemed more than acceptable for many applications. The sample has also exhibited a weight loss of approximately 1% following this thermal treatment.

Figure 1:
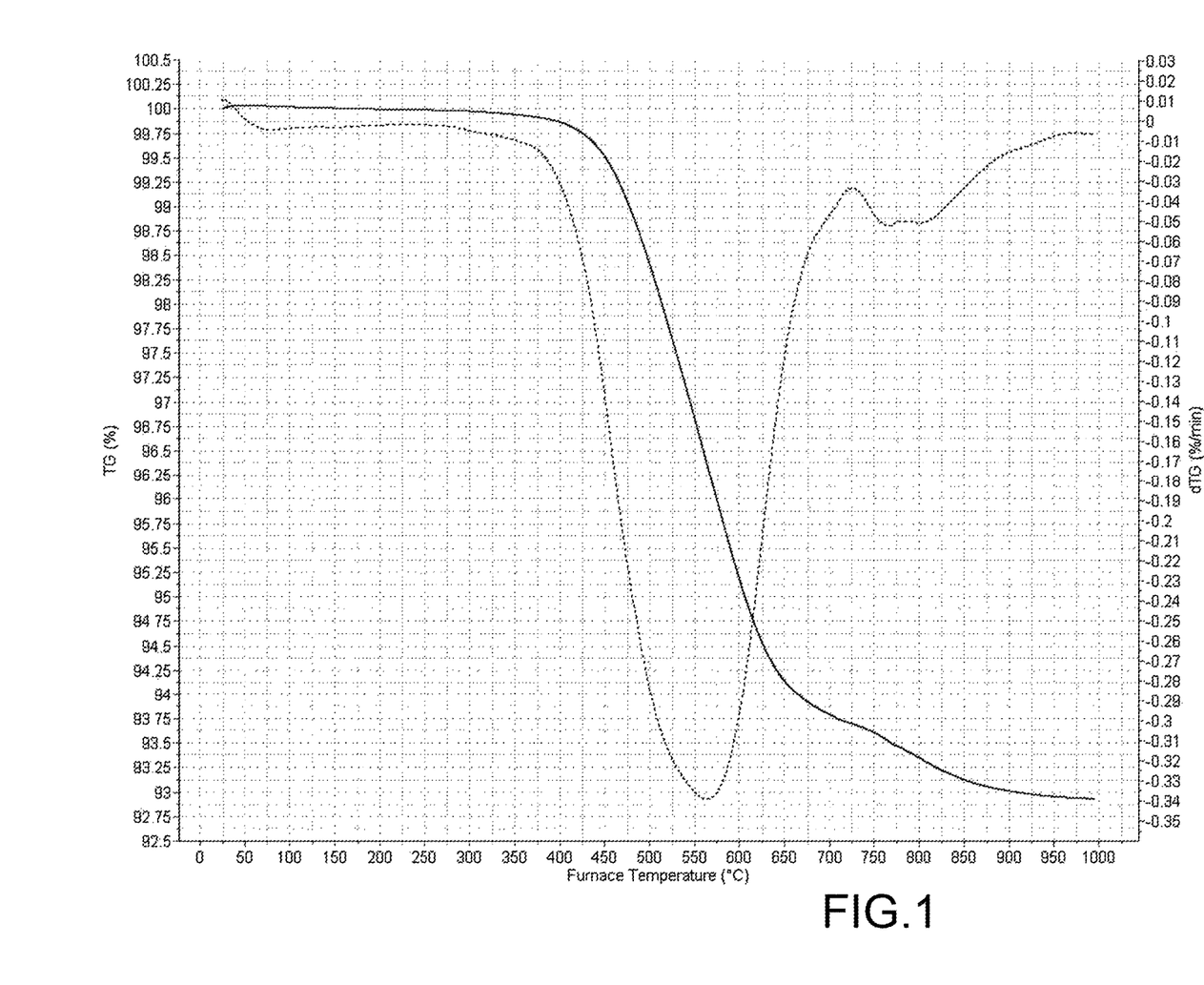
FIG. 1 shows the graphs relating to thermogravimetric analysis (TGA) in inert atmosphere, carried out on an "as cured" composite obtained by complete cross-linking of a pre-impregnated fibre-reinforced composite material according to the invention and heated to 10° C./min.

The "as cured" composite was also subjected to thermogravimetric analysis (TGA) in inert atmosphere, conducted according to the ASTM E-1131 Standard. The sample exhibited a weight loss of approximately 1% following thermal treatment. The measurement highlighted the excellent thermal stability of the composite, which in inert atmosphere exhibited practically no weight loss until 400° C., as shown in FIG. 1.

Figure 2:
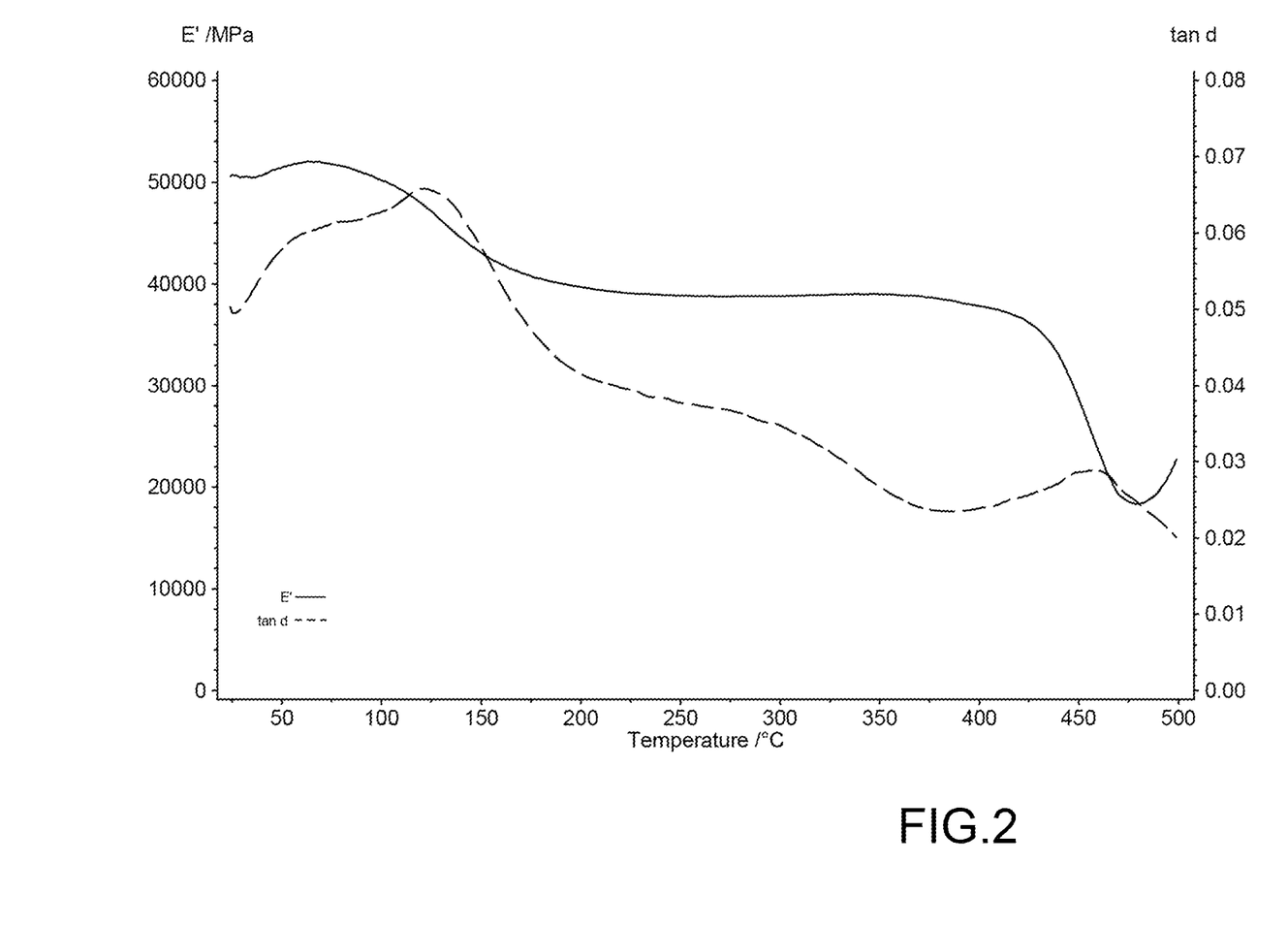
FIG. 2 shows the graph relating to Dynamic Mechanical Analysis (DMA) measurements carried out on an "as cured" composite obtained by complete cross-linking of a pre-impregnated fibre-reinforced composite material according to the invention.

The "as cured composite" was also subjected to Dynamic Mechanical Analysis (DMA) measurements; this technique makes it possible to estimate the trend of the elastic modulus of a material as a function of temperature. The graph shown in FIG. 2 illustrates a measurement conducted on the composite obtained with unidirectional PAN fibres, oriented at 0°. The graph indicates that the composite shows a medium-high elastic module E' (around 50 GPa) at ambient temperature, with a slight decline, down to approximately 40 GPa, between 100° C. and 180° C. In the temperature range between 180° C. and 400° C., the composite has a stable elastic modulus, around 40 GPa. This test demonstrates that the "as cured" composite retains excellent rigidity up to 400° C.

The tests confirmed that the pre-impregnated fibre-reinforced composite material according to the present invention—after forming and complete curing ("as cured" composite)—can lead to the production of components intended to operate up to a temperature of 400° C. A typical application is the production of components for thermal or flameproof barriers or components with structural function that have to operate at high temperatures.

Also tested was an "as cured" fibre-reinforced composite material obtained from a pre-preg with the characteristics shown in Table 4, but subjected to forming by vacuum bagging and subsequent treatment in autoclave at a pressure of 6 bar and a temperature of 180° C. for a time of 4 hours with temperature increase ramps of 2° C./min. A post curing cycle was then carried out at 300° C. for the time of 1 hour with up ramp of 2° C./min.

The "as cured" fibre-reinforced composite material according to the invention thus obtained was characterized with 3-point flexural tests carried out at temperature (in accordance with the ASTM-D790 standard).

At the temperature of 285° C. the "as cured" fibre-reinforced composite material had ultimate tensile stress of (134.6+/−20.1) MPa and an elastic modulus of (20.5+/−8.8) GPa.

The test confirmed that also with forming by vacuum bagging and subsequent treatment in autoclave the "as cured" fibre-reinforced composite material that is obtained has good mechanical characteristics, albeit inferior to those obtained with hot forming by compression molding. The material also exhibited good thermal stability.

Also tested were fibre-reinforced composite materials according to the present invention, obtained starting from pre-preg (according to the inventions) impregnated with a formulation of the polymeric binder composition, also containing organic resins. In particular, a formulation made with carbon fibres from polyacrylonitrile (PAN). The formulation corresponds to the one indicated in Table 3 above.

The polymeric binder composition used was the same mixture of two siloxane resins used in the examples described above, but with the addition of a Norsophen® 1203 phenolic resin, produced and sold by Bakelite Company.

From an operative viewpoint, the procedure followed was as in the preceding examples. In particular, the carbon fibres were used in the form of a unidirectional laminate, i.e. consisting of fibres oriented along only one direction.

The impregnated laminate (pre-preg) thus obtained was then subjected to forming, inducing the curing (cross-linking) of the resins, without any subsequent treatment ("as cured" composite) obtaining a fibre-reinforced composite material according to the invention.

In particular, similarly to the preceding examples, hot forming was carried out by compression molding, obtaining a completely cross-linked fibre-reinforced composite material with polymeric matrix, identified below as "as cured". No post-curing step was carried out.

Some samples of fibre-reinforced composite material obtained after forming and complete cross-linking of the resins, without any subsequent treatment ("as cured" composite), were characterized conducting 3-point flexural tests in accordance with the ASTM C-1341 standard.

Table 6 shows the values of some mechanical properties of a sample of fibre-reinforced composite material, obtained with unidirectional laminate of PAN fibres, completely cross-linked, obtained by compression molding at a pressure of 51 bar. The characterization was conducted with 3-point flexural test in accordance with the ASTM C-1341 standard, testing the sample with fibre orientation at 0°, i.e. parallel to the greater dimension of the specimen.

TABLE 6

| Sample | Ultimate tensile stress [MPa] | | MOE [GPa] | | Deformation at break [%] | |
|---|---|---|---|---|---|---|
| Composite "as cured" | Mean | St. Dev. | Mean | St. Dev. | Mean | St. Dev. |
| UD Laminate PAN Fibers Orient. 0° | 572 | 20 | 80.9 | 2.5 | 0.82 | 0.12 |

The material obtained starting from a pre-preg according to the invention containing also organic resins exhibited mechanical characteristics comparable to a material obtained starting from a pre-preg according to the invention but without organic resins.

An aspect that significantly influences the characteristics of the composites obtained starting from the pre-pregs according to the invention is the forming technique, which leads in particular to the complete cross-linking of the resins/polymers.

Two forming techniques were evaluated:
Compression molding
Vacuum Bagging followed by curing in autoclave.

The different forming techniques typically work at different pressures. A higher pressure allows to obtain a higher density of the composite and hence superior mechanical characteristics.

In the case of compression molding, pressures from 20 to approximately 80-100 bar; in the case of vacuum bagging (followed by curing in autoclave), pressures of the order of 2-14 bar can be applied.

The forming procedure is particularly important if the "as cured" pre-preg according to the invention is used, because it influences the final density of the composite thus obtained. In case of forming by compression molding the density of the "as cured" final composite increases as the molding pressure increases.

Figure 3:
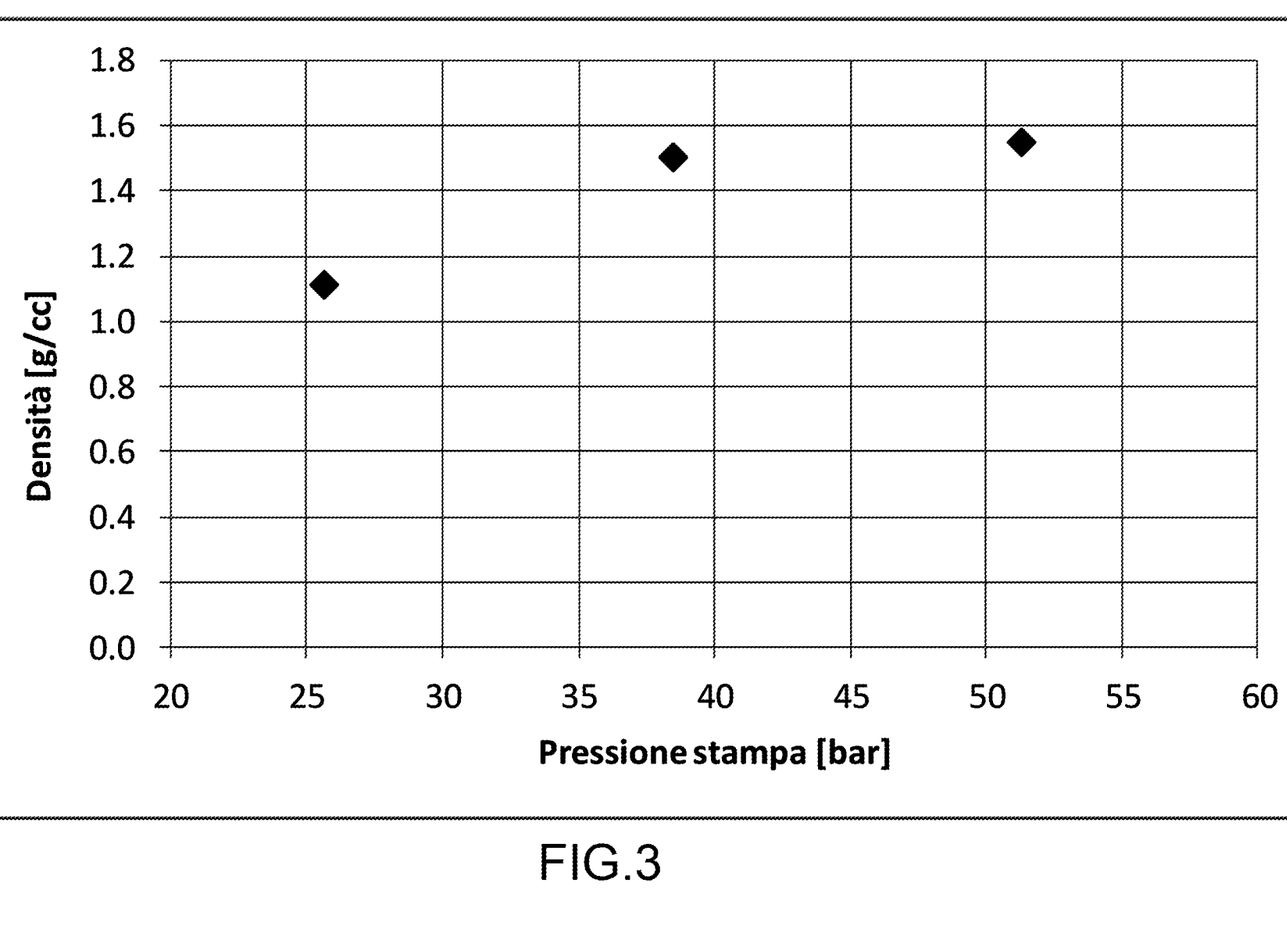
FIG. 3 shows the graph of the pattern of the density of an "as cured" composite—obtained by complete cross-linking of a pre-impregnated fibre-reinforced composite material according to the invention by compression molding—as a function of the molding pressure.

The graph of FIG. 3 shows the density of the "as cured" composite as a function of the molding pressure in the case of the pre-preg based on PAN fibres formed by compression molding. Above approximately 50 bar, the maximum densification of the composite, and hence the optimal mechanical characteristics, are obtained.

It can be affirmed that compression molding is indicated for:
forming composites with superior mechanical characteristics;
making pieces with planar and simple shape;
more rapid process times.

Vacuum bagging instead is more indicated for forming pieces with complex shapes.

If the pre-preg according to the invention has to be applied "as cured" it is important to maximize molding density.

The invention thus conceived therefore achieves the preset purposes.

Obviously, in its practical embodiment the invention may also assume different shapes and configurations from the one illustrated above, without thereby departing from the present scope of protection.

In addition, all details may be replaced by technically equivalent elements and the dimensions, the shapes and the materials used may be any, according to the needs.

The invention claimed is:

1. Pre-impregnated fibre-reinforced composite material in laminar form, obtained by impregnating a fibrous mass with a polymeric binder composition and destined to be subjected to subsequent forming and complete curing operations to obtain a fibre-reinforced composite material,
    wherein said polymeric binder composition is based on one or more resins selected from the group consisting of siloxane resins and silsesquioxane resins, and may optionally comprise one or more organic resins, said siloxane resins comprising polysiloxanes and said silsesquioxane resins comprising polysilsesquioxanes,
    wherein said polymeric binder composition further comprises at least a stabilizing agent selected from the group consisting of acetophenone, ethylbenzene, diethylbenzene, ethylstyrene, 2-tert-butylphenol, 2,6-di-tert-butylphenol, butylated hydroxytoluene, 2,4-dimethyl-6-tert-butylphenol; and
    wherein said polymeric binder composition appears as a liquid having viscosity of between 55000 and 10000 mPa·s at temperatures of between 50° C. and 70° C.,
    wherein the polymeric binder composition forms a polymeric binder matrix not crosslinked or only partially crosslinked which fills the interstices of the fibrous mass.

2. Material according to claim 1, wherein said polymeric binder composition appears as a pseudoplastic liquid up to temperatures of approximately 60° C. tending to a Newtonian behavior beyond this temperature, with viscosity between approximately 55000 mPa·s at 50° C. applying a shear rate of 1 s$^{-1}$ and approximately 10000 mPa·s at 70° C. regardless of shear rate.

3. Material according to claim 1, wherein said polymeric binder composition only comprises resins selected from the group consisting of siloxane resins and silsesquioxane resins.

4. Pre-impregnated fibre-reinforced composite material according to claim 1, wherein said polymeric binder composition constitutes from 25% to 60% by weight of said pre-impregnated fibre-reinforced composite material and wherein said fibrous mass constitutes from 40% to 75% by weight of said pre-impregnated fibre-reinforced composite material.

5. Pre-impregnated fibre-reinforced composite material according to claim 4, wherein the solid resin at room temperature is selected from the group consisting of a phenyl siloxane, methyl siloxane, phenyl methyl silsesquioxane, methyl silsesquioxane resin, and wherein said liquid resin at room temperature is selected from the group consisting of a methyl methoxy siloxane and methyl phenyl vinyl siloxane resin.

6. Pre-impregnated fibre-reinforced composite material according to claim 1, wherein said polymeric binder composition comprises a mixture of:
at least one resin selected from the group consisting of siloxane resins and silsesquioxane resins, solid at room temperature, with melting point range of between 40° C. and 90° C.; and
at least one resin selected from the group consisting of siloxane resins and silsesquioxane resins, liquid at room temperature, with viscosity at room temperatures of between 1 mPa·s and 5000 mPa·s;
the weight ratio between solid resin at room temperature and liquid resin at room temperature is of between 100/30 and 100/50.

7. Pre-impregnated fibre-reinforced composite material according to claim 1, wherein said polymeric binder composition comprises a mixture of:
a single resin selected from the group consisting of siloxane resins and silsesquioxane resins, liquid at room temperature, with viscosity at room temperatures of between 1 mPa·s and 5000 mPa·s and
an inert filler in powder,
the volume ratio of inert filler to liquid polymer at room temperature is of between 10/100 and 40/100.

8. Pre-impregnated fibre-reinforced composite material according to claim 1, wherein said polymeric binder composition further comprises at least one solvent, selected from the compounds able to solubilize the polysiloxanes and the polysilsesquioxanes.

9. Pre-impregnated fibre-reinforced composite material according to claim 8, wherein said solvent is selected in the class of vinyl compounds.

10. Pre-impregnated fibre-reinforced composite material according to claim 8, wherein said at least one solvent and/or at least one stabilizing agent constitute, alone or mixed together—less than 1% by weight of the pre-impregnated fibre-reinforced composite material.

11. Pre-impregnated fibre-reinforced composite material according to claim 8, wherein said solvent is divinylbenzene.

12. Pre-impregnated fibre-reinforced composite material according to claim 1, wherein said polymeric binder composition further comprises at least one catalyst suitable to promote the cross-linking of the polymers of said polymeric composition at temperatures higher than 100° C.

13. Pre-impregnated fibre-reinforced composite material according to claim 1, wherein said polymeric binder composition further comprises a thermo-insulating inert filler.

14. Pre-impregnated fibre-reinforced composite material according to claim 1, wherein said fibrous mass consists of fibres selected from the group consisting of carbon fibres, glass fibres, ceramic fibres or mixtures thereof.

15. Pre-impregnated fibre-reinforced composite material according to claim 1, wherein said fibrous mass consists of continuous fibres forming one or more layers of fabric or nonwoven fabric.

16. Pre-impregnated fibre-reinforced composite material according to claim 1, wherein said fibrous mass consists of chopped fibres dispersed in the matrix formed by said polymeric binder composition.

17. Manufactured article obtained by hot forming and complete curing of a pre-impregnated fibre-reinforced composite material according to claim 1, wherein said manufactured article consists of a fibre-reinforced composite material comprising a solid polymeric binder matrix that fills the interstices of the fibrous mass of said pre-impregnated fibre-reinforced composite material and is based on polysiloxanes and/or polysilsesquioxanes, cross-linked to each other due to the cross-linking induced by the complete curing of said one or more resins of the polymeric binder composition of said pre-impregnated fibre-reinforced composite material.

18. Manufactured article according to claim 17, wherein said solid polymeric binder matrix constitutes from 25% to 60% by weight of said fibre-reinforced composite material and wherein said fibrous mass constitutes from 40% to 75% by weight of said fibre-reinforced composite material.

19. Manufactured article according to claim 17, wherein said solid polymeric binder matrix comprises a thermo-insulating inert filler in powder form.

20. Manufactured article according to claim 17, wherein said forming is obtained hot by compression molding technique.

21. Manufactured article according to claim 17, wherein said forming is carried out by vacuum bagging and subsequent heat treatment of curing.

22. Manufactured article according to claim 17, wherein it is a thermal or flame barrier or it is a structural component destined to operate at temperatures up to 400° C.

23. Method for making a manufactured article according to claim 17, comprising the following operating steps:
arranging a pre-impregnated fibre-reinforced composite material with a polymeric binder composition according to claim 1; and
forming said pre-impregnated fibre-reinforced composite material bringing said polymeric binder composition to curing so as to obtain said article,
wherein said forming leads to the curing of said one or more resins of the polymeric binder composition, and thus to the formation of a solid polymeric binder matrix that fills the interstices of the fibrous mass of said pre-impregnated fibre-reinforced composite material and is based on polysiloxanes and/or polysilsesquioxanes, cross-linked to each other due to the cross-linking induced by the complete curing of said one or more resins of the polymeric binder composition.

24. Method according to claim 23, wherein said forming is carried out by hot by compression molding technique.

25. Method according to claim 23, wherein said forming is carried out by vacuum bagging and subsequent heat treatment of curing.

26. Method for making a pre-impregnated fibre-reinforced composite material destined to be subjected to subsequent forming and complete curing operations to make a fibre-reinforced composite material, comprising the following operating steps:
arranging a fibrous mass in laminar form;
arranging a polymeric binder composition;
impregnating said fibrous mass with said polymeric binder composition obtaining a pre-impregnated fibre-reinforced composite material
wherein said polymeric binder composition is based on one or more resins selected from the group consisting of siloxane resins and silsesquioxane resins, and may optionally comprise one or more organic resins, said siloxane resins comprising polysiloxanes and said silsesquioxane resins comprising polysilsesquioxanes, wherein said polymeric binder composition further comprises at least one stabilizing agent selected from the group consisting of acetophenone, ethylbenzene, diethylbenzene, ethylstyrene, 2-tert-butylphenol, 2-6-di-tert-butylphenol, butylated hydroxytoluene, 2,4-dimethyl-6-tert-butylphenol, and wherein said polymeric binder composition appears as a liquid having viscosity of between 55000 and 10000 mPa·s at temperatures of between 50° C. and 70° C., wherein following the impregnation step the polymeric binder composition forms a polymeric binder matrix not crosslinked or only partially crosslinked which fills the interstices of the fibrous mass.

27. Method according to claim 26, wherein said polymeric binder composition appears as a pseudoplastic liquid up to temperatures of approximately 60° C. tending to a Newtonian behavior beyond this temperature, with viscosity between approximately 55000 mPa·s at 50° C. applying a shear rate of 1 s$^{-1}$ and approximately 10000 mPa·s at 70° C. regardless of shear rate.

28. Method according to claim 26, wherein said polymeric binder composition further comprises at least one solvent, selected among the compounds able to solubilize polysiloxanes and polysilsesquioxanes.

29. Method according to claim 28, wherein said solvent is selected from the cast of vinyl compounds.

30. Method according to claim 28, wherein said at least one solvent and/or at least one stabilizing agent constitute—alone or mixed together—less than 1% by weight of the pre-impregnated fibre-reinforced composite material.

31. Method according to claim 28, wherein said solvent is divinylbenzene.

* * * * *